United States Patent
Xu et al.

(10) Patent No.: US 11,741,130 B2
(45) Date of Patent: Aug. 29, 2023

(54) SUMMARIZING CONVERSATIONS IN A MESSAGING APPLICATION WITH INTERNAL SOCIAL NETWORK DISCOVERY

(71) Applicant: International Business Machines Corporation, Armonk, NY (US)

(72) Inventors: Jing James Xu, Xi'an (CN); Ji Hui Yang, Beijing (CN); Jing Xu, Xi'an (CN); Lei Gao, Xian (CN); Si Er Han, Xi'an (CN); Xue Ying Zhang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 17/403,306

(22) Filed: Aug. 16, 2021

(65) Prior Publication Data
US 2023/0049085 A1    Feb. 16, 2023

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2272* (2019.01); *G06Q 30/04* (2013.01)

(58) Field of Classification Search
None
See application file for complete search history.

(56) References Cited

U.S. PATENT DOCUMENTS 8,676,913 B1    3/2014   Roche et al.
8,788,603 B2    7/2014   Griffin et al.
(Continued)

FOREIGN PATENT DOCUMENTS

| CN | 108229731 A | 6/2018 |
| CN | 110825972 A | 2/2020 |
| WO | 2001065334 A2 | 9/2001 |

OTHER PUBLICATIONS

Bengel et al., ChatTrack: Chat Room Topic Detection Using Classification, Mar. 2004.
(Continued)

*Primary Examiner* — Debbie M Le
(74) *Attorney, Agent, or Firm* — Garg Law Firm, PLLC; Rakesh Garg; Nicholas Welling

(57) ABSTRACT

An embodiment includes parsing conversation data to extract a message dataset and a user dataset. The embodiment classifies the message dataset into a category using machine learning processing and identifies the category as a top category based at least in part on an amount of the conversation data associated with the category. The embodiment generates impact data associated with the user dataset based on actions in the conversation data by the user. The embodiment generates role data associated with the user by applying a rule to the conversation data for the user. The embodiment generates key index data associated with the message dataset by identifying interactions with a message represented by the message dataset. The embodiment generates output data arranged according to a specified data format that is compatible with a user interface.

20 Claims, 13 Drawing Sheets

(51) Int. Cl.
*G06F 16/22* (2019.01)
*G06Q 30/04* (2012.01)

(56) References Cited

U.S. PATENT DOCUMENTS

| | | | |
|---|---|---|---|
| 8,793,324 B1 | 7/2014 | Schabes et al. | |
| 10,902,209 B2 * | 1/2021 | Pienkosz | G06N 3/084 |
| 11,115,531 B1 * | 9/2021 | Shi | G06N 20/00 |
| 11,343,114 B2 * | 5/2022 | Zheng | G06F 3/0482 |
| 2011/0246378 A1 * | 10/2011 | Prussack | G06Q 50/184 |
| | | | 705/347 |
| 2014/0351719 A1 * | 11/2014 | Cattermole | H04L 65/403 |
| | | | 715/753 |
| 2019/0340580 A1 * | 11/2019 | Bentley | G06F 16/337 |
| 2022/0027559 A1 * | 1/2022 | Wang | H04L 51/42 |
| 2022/0245354 A1 * | 8/2022 | Mackay | G06V 20/41 |

OTHER PUBLICATIONS

Strzalkowski et al., Modeling Leadership and Influence in Multi party Online Discourse, Dec. 2012.

Dong et al., Structural analysis of chat messages for topic detection, vol. 30, No. 5, 2006, pp. 496-516.

\* cited by examiner

SUMMARIZING CONVERSATIONS IN A MESSAGING APPLICATION WITH INTERNAL SOCIAL NETWORK DISCOVERY

BACKGROUND

The present invention relates generally to a method, system, and computer program product for messaging applications. More particularly, the present invention relates to a method, system, and computer program product for summarizing conversations in a messaging application with internal social network discovery.

A variety of messaging applications are in common use today that allow for real-time or near real-time exchange of text-based messages. These include applications referred to as chatting, Instant Messaging (IM), and texting using Short Message Service (SMS). Many messaging applications now also allow more than just text-based communications. For example, many messaging applications allow users to respond to messages with a variety of different interactions, such as allowing a user to "like" a message, "favorite" a message, or select from a variety of different reaction emojis.

Messaging applications typically organize messages into messaging groups or conversations. A user can create a new group or conversation by selecting another user or group of users, sometimes referred to as contacts, with which to initiate a conversation. Once initiated, the messaging application provides a dedicated conversation window for communications among the members of the selected group. Messaging applications typically continue in this fashion, creating new conversation windows for each unique combination of users. Messaging applications typically include a view of multiple past and ongoing conversations identified by group names or the name of one or more users in the conversation. Over time, a user will often accumulate a long list of such conversations in the messaging application.

SUMMARY

The illustrative embodiments provide for summarizing conversations in a messaging application. An embodiment includes parsing conversation data to extract a message dataset and a user dataset. The embodiment also includes classifying the message dataset into a first category, where the classifying of the message dataset comprises analyzing the message dataset using machine learning. The embodiment also includes identifying the first category as a top category from among a plurality of categories associated with the conversation data, where the plurality of categories comprises the first category, where the identifying of the first category as the top category is based at least in part on an amount of the conversation data associated with the first category. The embodiment also includes generating impact data associated with the user dataset, where the generating of the impact data comprises iterating through conversation data associated with the top category and identifying actions in the conversation data by a user represented by the user dataset. The embodiment also includes generating role data associated with the user dataset, where the generating of the role data comprises applying a rule to the conversation data for the user represented by the user dataset. The embodiment also includes generating key index data associated with the message dataset, where the generating of the key index data comprises iterating through conversation data associated with the top category and identifying interactions with a message represented by the message dataset in the conversation data. The embodiment also includes generating output data arranged according to a specified data format that is compatible with a user interface, where the generating of the output data comprises formatting a role represented by the role data and an impact value represented by the impact data for the user represented by the user dataset and formatting a key index value represented by the key index data for the message represented by the message dataset. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
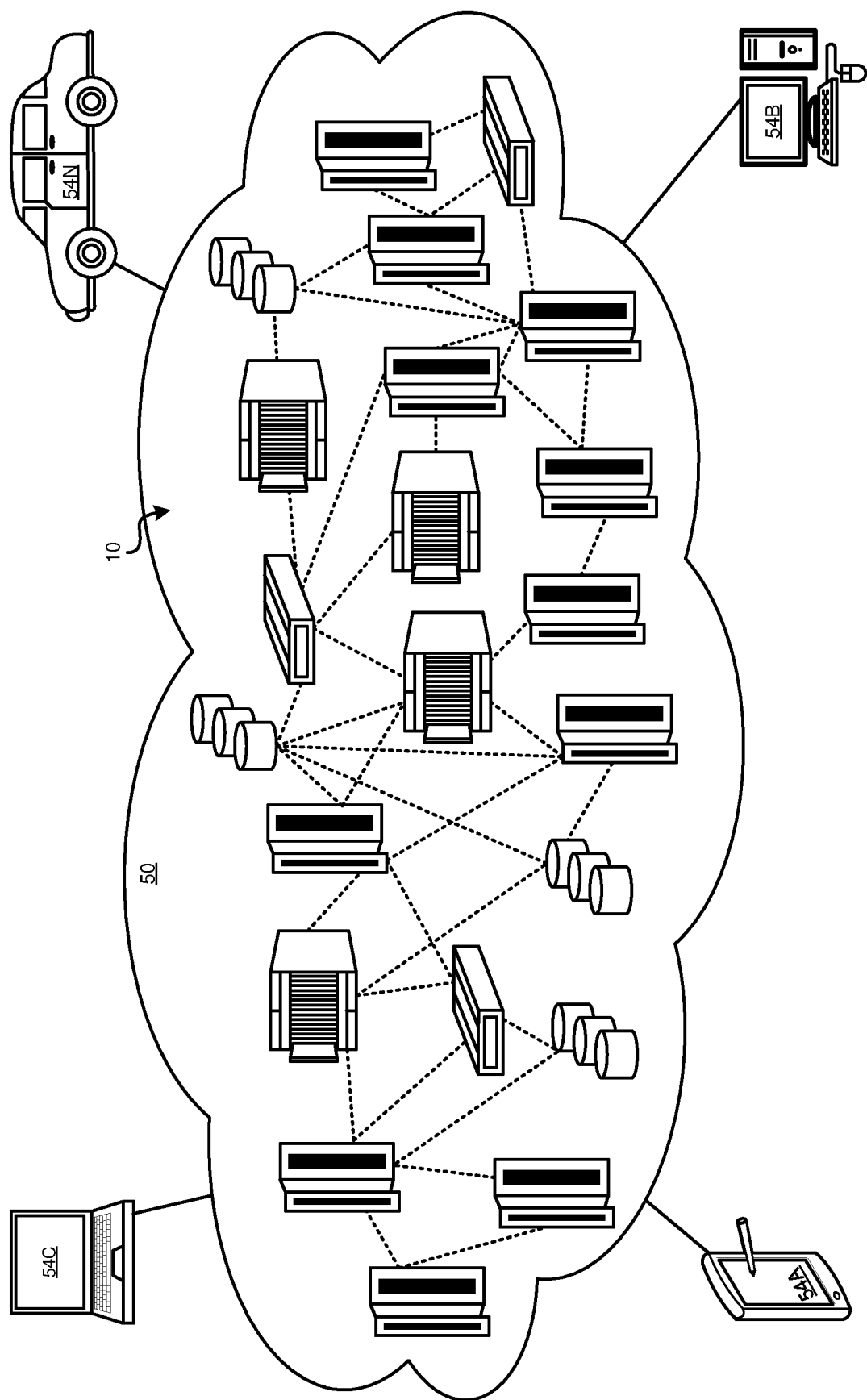
FIG. 1 depicts a cloud computing environment according to an embodiment of the present invention.

Messaging applications allow users to communicate over a computer network using a graphical user interface (GUI) that organizes messages into conversations. Users can create new conversations that involve a select group of users. Some messaging applications also allow users to create new conversations, or automatically create new conversations, based on other criteria, such as a keyword or hashtag. Some messaging applications also include conversations in the form of channels or chat rooms that allow users to be added and removed.

Over time, a user can accumulate numerous conversations in a messaging application. A messaging application will typically include a list view of the user's conversations. The conversation list view may include a group name, channel name, or the name of one or more users, and a most recent message in the conversation. When a user selects a conversation from the conversation list view, the user can see some number of most recent messages in the conversation. However, this information does not provide a reliable indication of the main topic being discussed in each conversation. In addition, messaging applications often include informal or off-topic comments and media elements. This leaves the user to select and scan through messages of each conversation to get an understanding of the main topics being discussed. This can be particularly time-consuming for users of messaging applications that include numerous active users and conversations.

The illustrative embodiments recognize that artificial intelligence technologies can be used to identify a topic of conversation for purely text-based content. For example, natural language processing (NLP) technology can be used to analyze a segment of text and identify a category of the text segment. NLP technology can also be used to determine characteristics of the text, such as emotions and sentiment of the messages. The illustrative embodiments also provide for evaluating conversation data to construct social network information and automatically assign roles to users and provide a summary that displays these roles, allowing a user to identify otherwise ambiguous roles in creating the conversation data.

In an illustrative embodiment, a summarization process receives and parses conversation data to extract message datasets and user datasets. The summarization process classifies the message datasets into respective categories. In some embodiments, the summarization process uses machine learning analysis. For example, in some embodiments, the summarization process uses Natural Language Processing (NLP), such as Natural Language Understanding (NLU), to identify categories in messages represented by the message datasets.

The summarization process also identifies one or more top categories from among the identified categories. In some embodiments, the summarization process identifies top categories based on respective amounts of associated conversation data. For example, in some embodiments, the summarization process identifies top categories for a summary period by identifying categories associated with messages that are more than $\mu$.% of all messages for that summary period, where $\mu$.% is any desired percentage and may be adjustable by user settings.

The summarization process determines an impact each user has on each of the top categories. For each top category, the summarization process generates impact data for each user who contributed to the top category. In some embodiments, the summarization process generates impact data for a user who contributed to a particular top category by iterating through conversation data of the top category to identify the user's interactions and generate an impact factor value based on the identified interactions. In some embodiments, the summarization process generates a numerical impact factor value for each user based on the accumulated impact data.

The summarization process also determines which contributing users fulfill certain roles for each of the top categories. For each top category, the summarization process generates role data for certain contributing users who fulfilled predetermined requirements for at least one of the roles. In some embodiments, the summarization process generates role data for a user who contributed to a particular top category by applying a rule to the conversation data for the user represented by the user dataset. There are a wide variety of possible roles and associated rules that would be implementation-specific that may be used for actual implementations of the embodiments disclosed herein. As non-limiting examples, one rule may assign the role of "originator" to a user who posted a first message for a particular category, another rule may assign the role of "contributor" to a user who has an impact factor value that is one of the top N impact factor values of users for the associated category (where N may be any desired integer and may be assigned a value based on user settings).

The summarization process identifies key messages for each of the top categories. For each top category, the summarization process generates key index data for each message in the top category. In some embodiments, for each top category, the summarization process generates key index data by iterating through conversation data associated with the top category and identifying interactions with a message represented by the message dataset in the conversation data. The summarization process then identifies top message datasets for each top category. In some embodiments, for each top category, the summarization process identifies one or more top message datasets by comparing the key index data associated with the message dataset to key index data of other message datasets from the conversation data.

The summarization process generates output data arranged according to a specified data format that is compatible with a user interface. In some embodiments, the summarization process generates the output data by formatting a role represented by the role data and an impact value represented by the impact data for the user represented by the user dataset and formats a key index value represented by the key index data for the message represented by the message dataset.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
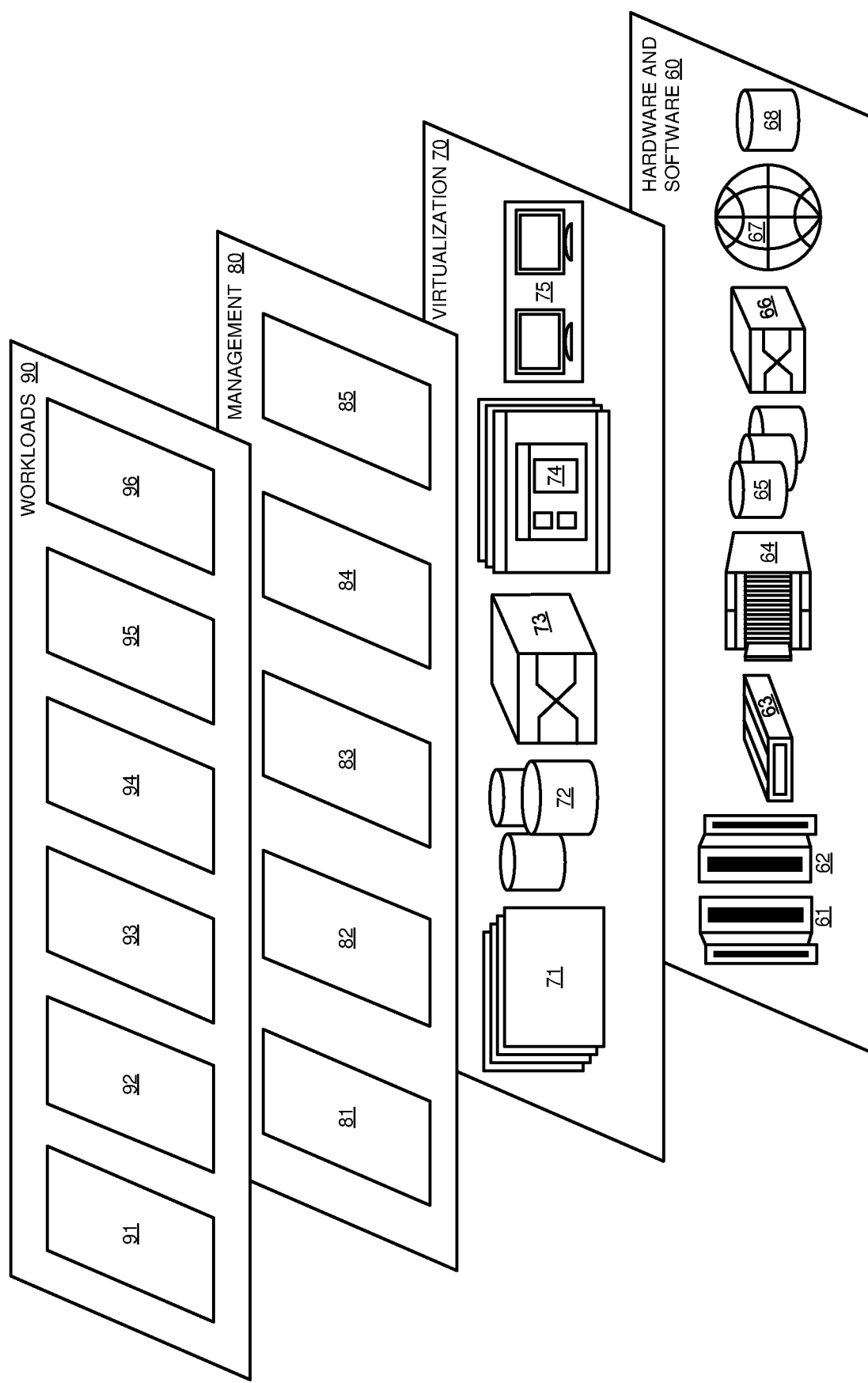
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and summarization processing 96.

Figure 3:
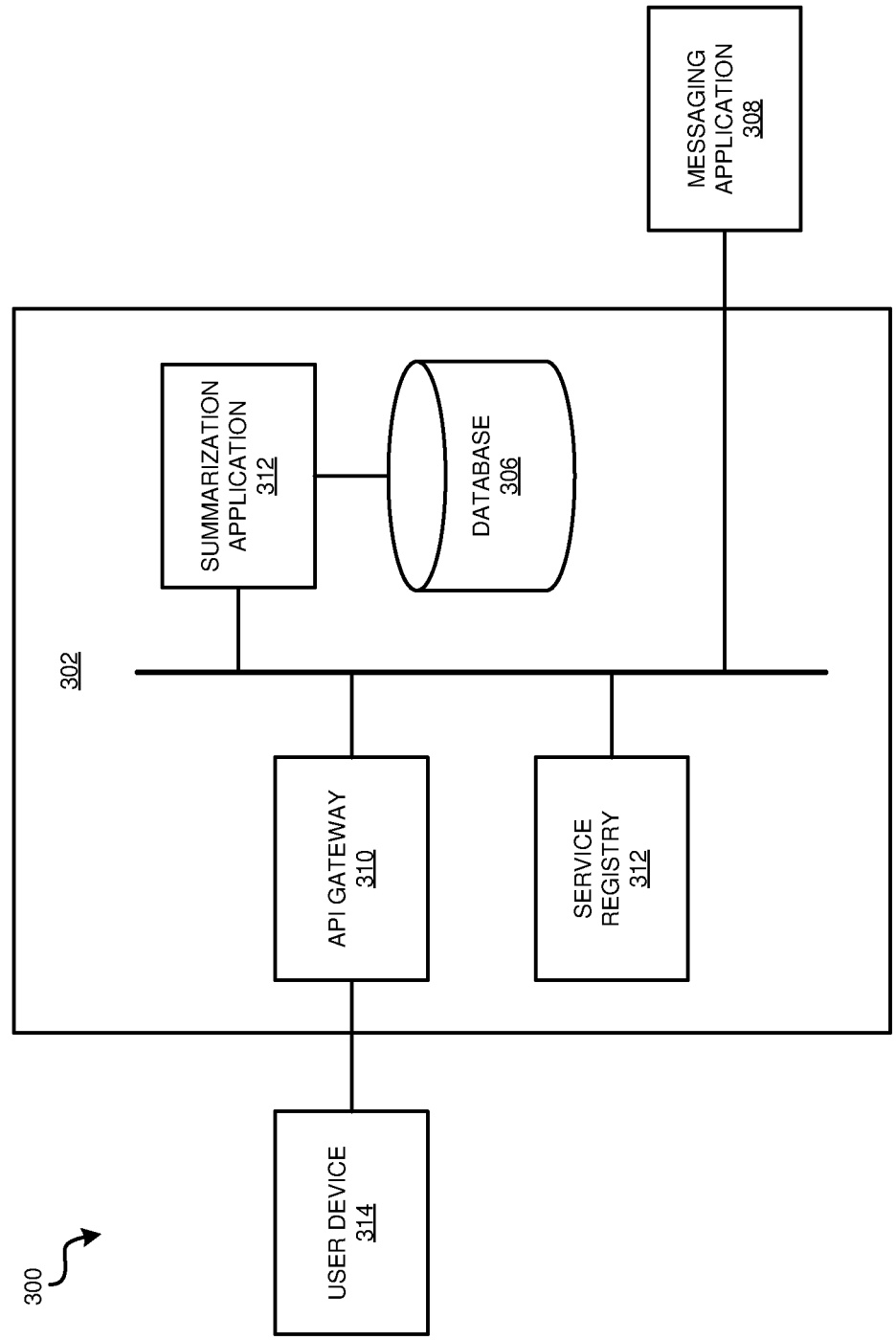
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that provides services and service instances to one or more user devices 314, including summarization services from summarization application 312 and database services from database 306, directly or indirectly through summarization application 312. In some embodiments, the summarization application 312 is deployed in workloads layer 90 of FIG. 2. By way of example, in some embodiments, the summarization application 312 provides summarization processing 96 in FIG. 2.

In the illustrated embodiment, the user device 314 communicates with service infrastructure 302 across one or more networks via an Application Programming Interface (API) gateway 310. In some embodiments, the service infrastructure 302 uses a distributed microservice architecture. In some such embodiments, the database 306 is a microservices-based database that runs as a distributed database across one or more servers. In some embodiments, the summarization application 312 is a microservices-based application that runs as a distributed system across one or more servers. In various embodiments, service infrastructure 302 and its associated summarization application 312 and database 306 serve multiple users and multiple tenants. A tenant is a group of users (e.g., a company) who share a common access with specific privileges to the software instance. Service infrastructure 302 ensures that tenant specific data is isolated from other tenants.

In some embodiments, user device 314 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like data correlation system 304, database 306, and application 308. API gateway 310 receives service requests issued by client applications and creates service lookup requests based on service requests. As a non-limiting example, in an embodiment, the user device 314 executes a routine to initiate a request to the summarization application 312, which in turn stores conversation data from messaging application 308 for a summary period, and then generates summary data summarizing the stored conversation data and provides the summary data to the user device 314 for display of the summary dashboard.

In the illustrated embodiment, service infrastructure 302 includes a service registry 312. In some embodiments, service registry 312 looks up service instances of the summarization application 312 and the database 306 in response to a service lookup request such as one from API gateway 310 in response to a service request from user device 314. For example, in some embodiments, the service registry 312 looks up service instances of the summarization application 312 and the database 306 in response to related requests from the user device 314.

In some embodiments, the service infrastructure 302 includes one or more instances of the summarization application 312 and the database 306. In some such embodiments, each of the multiple instances of the summarization application 312 and the database 306 run independently on multiple computing systems. In some such embodiments, the summarization application 312 and the database 306, as well as other service instances of the summarization application 312 and the database 306, are registered in service registry 312.

In some embodiments, service registry 312 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 312 ranks service instances based on their respective performance characteristics and selects top-ranking service instances for service discovery or service lookup requests. In the event that a service instance becomes unresponsive or, unhealthy, the service registry will no longer provide its address or information about this service instance to other services.

Figure 4:
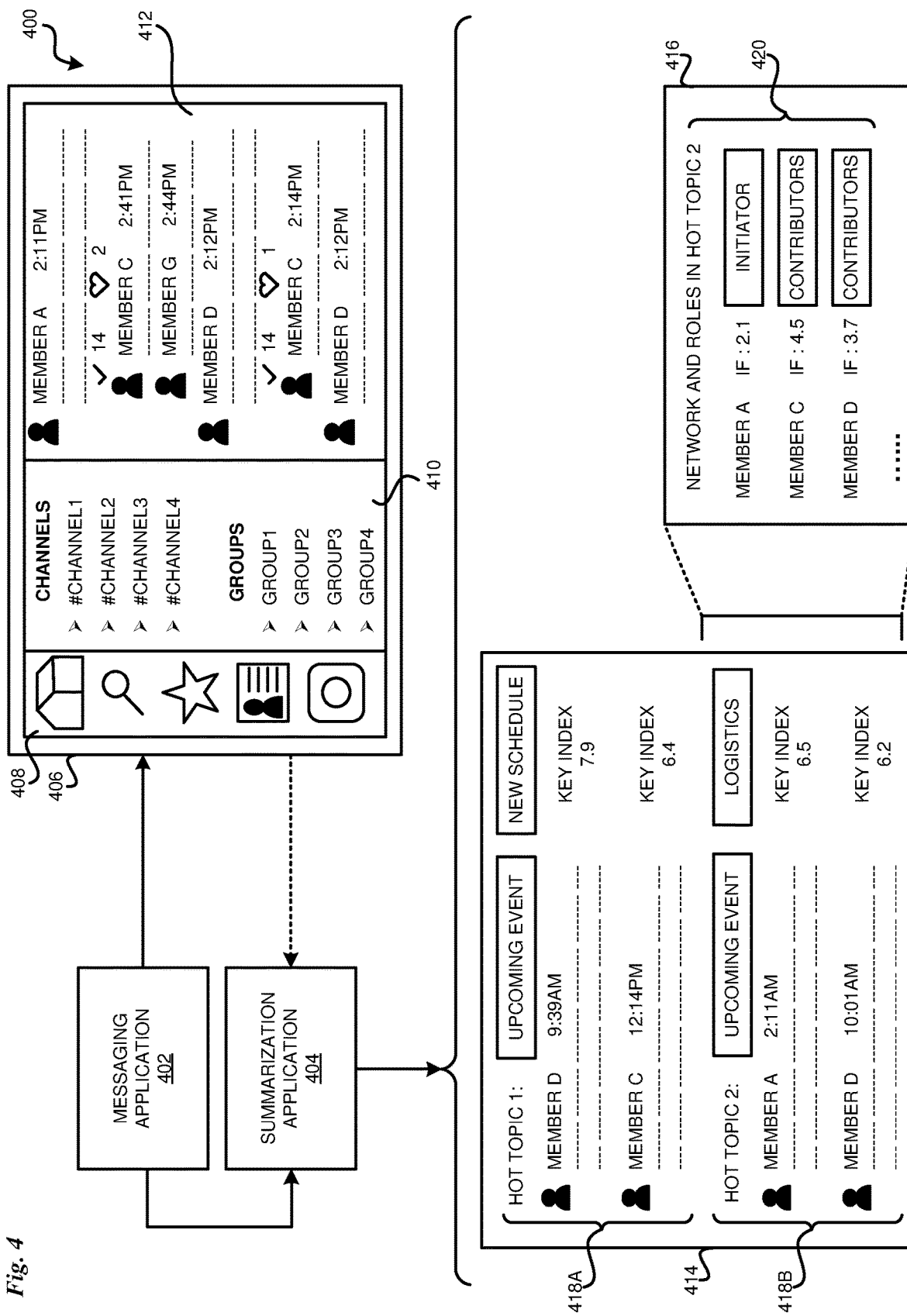
FIG. 4 depicts a block diagram of an example messaging application summarization environment in accordance with an illustrative embodiment.

With reference to FIG. 4, this figure depicts a block diagram of an example messaging application summarization environment 400 in accordance with an illustrative embodiment. The example embodiment includes a messaging application 402 that allows users to exchange messages and view conversations, and a summarization application 404 that summarizes conversations as described herein. In a particular embodiment, messaging application 402 is an example of messaging application 308 of FIG. 3 and summarization application 404 is an example of summarization application 312 of FIG. 3.

In some embodiments, the messaging application 402 generates a computer-generated user interface 402 that includes a navigation menu 408, a conversation list 410, and a conversation view 412. The example navigation elements in the navigation menu 408, listed conversations in the conversation list 410, and messages in the conversation view 412 are for purposes of illustration only and are not limiting of implementations of disclosed embodiments. For example, the messages in the conversation view 412 may be illustrative of a conversation thread comprised of various text messages displayed on a user device, such as a laptop computer, a desktop computer, or a tablet, smartphone, or other handheld computing device.

In some embodiments, a given user may receive tens or hundreds of electronic messages, text messages, discussion forum messages, and the like over any given period of time. The received messages may relate to a variety of different topics and subtopics. The messaging application 402 allows a user to scroll through these messages in the conversation list 410. In some embodiments, the conversations are referred to by other names, such as channels, groups, or chat rooms.

In the illustrated embodiment, the summarization application 404 receives messages from the messaging application 402 in the form of conversation data. In various embodiments, the summarization application 404 receives the conversation data from the messaging application 402 in real time, near real time, or in batches. The summarization application 404 processes the conversation data to generate summary data for a summary dashboard that includes one or more computer-generated user interfaces, such as computer-generated user interfaces 414 and 416. The example summary dashboard user interfaces 414 and 416 are shown for purposes of illustration only and are not limiting of implementations of disclosed embodiments. The summarization application 404 generates the summary dashboard periodically, at fixed or varying time intervals referred to as summary periods and includes summaries of activity that occurred during the most recent summary period.

In the illustrated embodiment, the example summary dashboard user interface 414 shows topic summaries for "hot topics," such as topic summaries 418A and 418B shown in FIG. 4. In some embodiments, a "hot topic" is a topic that includes more than a threshold percentage of user inputs during the most recent summary period. Thus, the number of hot topics may vary from one summary period to another. In some such embodiments, "user inputs" used for identifying a hot topic include posted messages, including original messages and replies to posted messages. In some such embodiments, "user inputs" used for identifying a hot topic further include other message interactions, for example reactions to a posted message, such as "likes," "dislikes," "favorites," etc.

In the illustrated embodiment, the example summary dashboard user interface 416 shows user summaries for "key users" for a selected hot topic, such as key user summary 420. The illustrated key user summary 420 includes summary information for key users for "hot topic 2," which is summarized as topic summary 418B. In the illustrated embodiment, the summarization application 404 generates a single view that includes key user summaries for all hot topics "hot topic 1" in a separate view. In alternative embodiments, a single view may include key user summaries for two or more of the hot topics.

Figure 5:
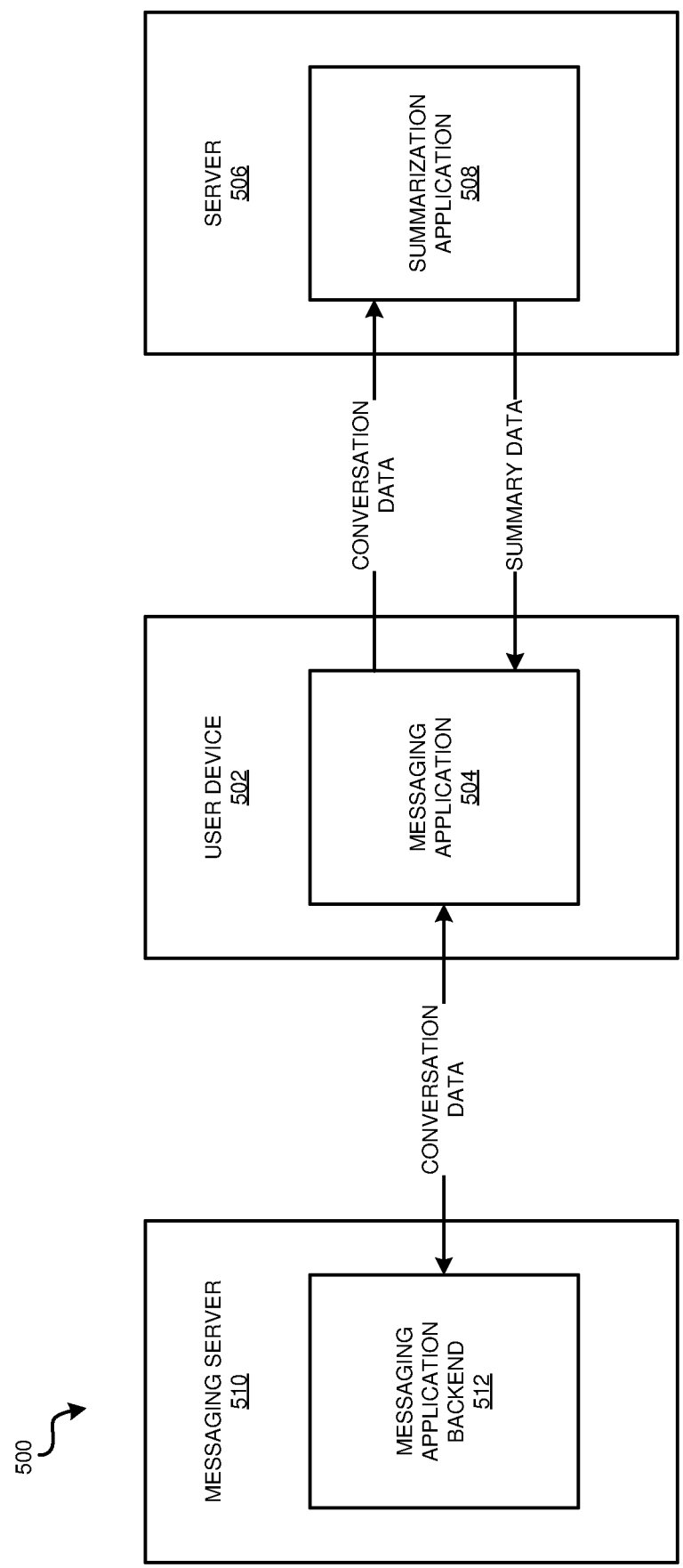
FIG. 5 depicts a block diagram of an example arrangement for providing functionality described herein that can be utilized with a summarization application in accordance with illustrative embodiments.

With reference to FIG. 5, this figure depicts a block diagram of an example arrangement 500 for providing functionality described herein that can be utilized with a summarization application in accordance with illustrative embodiments. In the illustrated embodiment, a user device 502 has a messaging application 504 installed that communicates over a network with a server 506 that hosts the summarization application 508. In some embodiments, the messaging application 504 generates a user interface as shown in FIG. 4 and allows a user to transmit and receive messages with other users communicating over a network. The messaging application 504 transmits these messages to the summarization application 508. In some embodiments, the messaging application 504 relays the messages in real-time or near real-time to the summarization application 508 as they are received by the messaging application 504. In other embodiments, the messaging application 504 transmits messages in batches to the summarization application 508 automatically, for example according to a pre-established schedule or other criteria. In other embodiments, the messaging application 504 transmits messages in batches to the summarization application 508 in response to a command input from a user.

In the illustrated embodiment, the summarization application 508 receives messages from the messaging application 504 and processes the messages to generate summary data that allows the messaging application 504 to render a summary dashboard, for example as shown in FIG. 4 as summary dashboard user interfaces 414 and 416. The summarization application 508 then transmits the summary data to the messaging application 504. In some embodiments, the process of receiving messages from the messaging application 504 and responding with summary data is an ongoing process that results in periodic revisions and updates to the summary dashboard being provided to the messaging application 504.

In the illustrated embodiment, a separate messaging server 510 hosts a server-side messaging application 512 associated with the messaging application 504 on the user device 502. The server-side messaging application 512 relays messages to and from the messaging application 504 on the user device 502 that are directed to or received from other user devices. In alternative embodiments, the server 506 also serves as a messaging server that hosts the server-side messaging application 512 for relaying messages to and from the messaging application 504 on the user device 502 that are directed to or received from other user devices.

Figure 6:
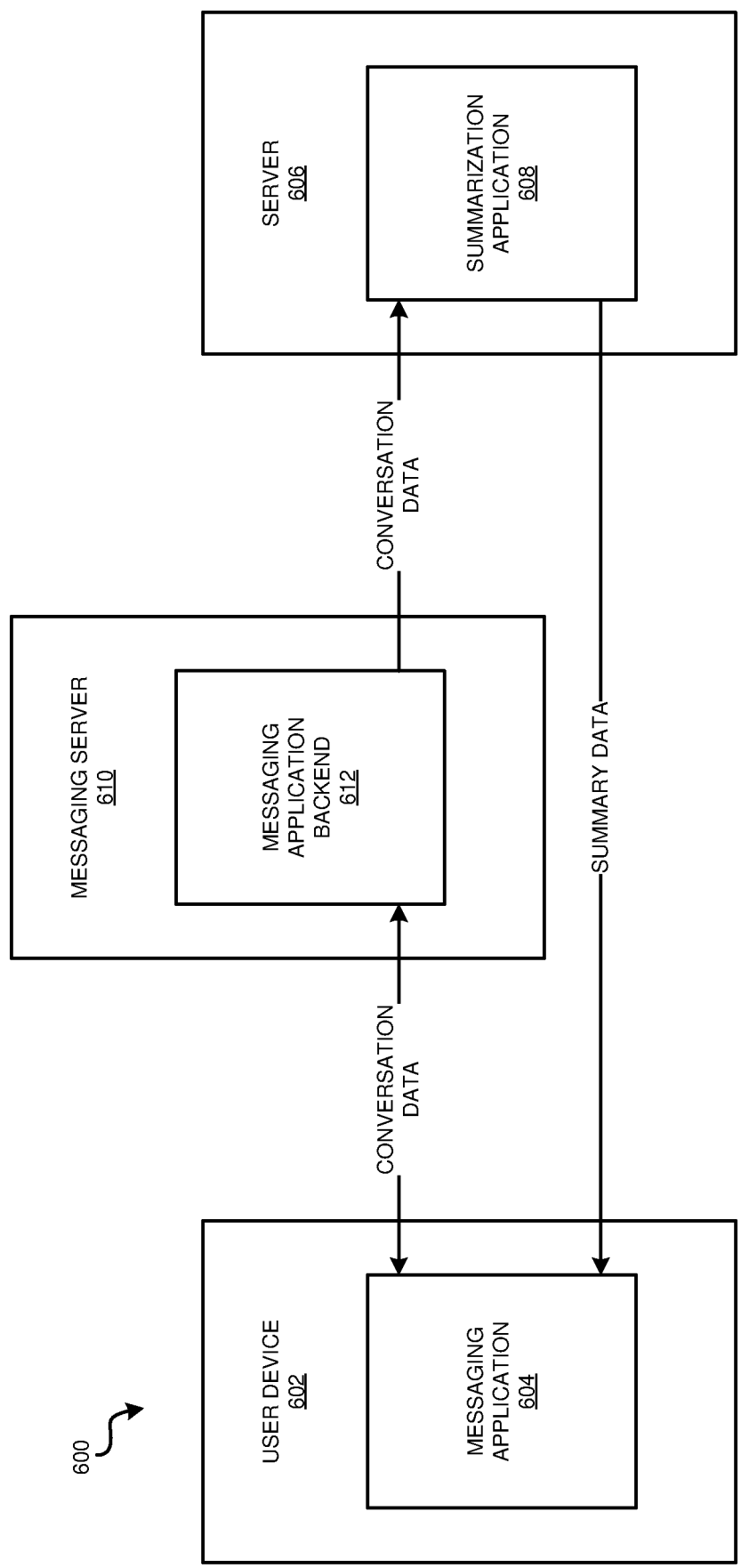
FIG. 6 depicts a block diagram of an example arrangement for providing functionality described herein that can be utilized with a summarization application in accordance with illustrative embodiments.

With reference to FIG. 6, this figure depicts a block diagram of an example arrangement 600 for providing functionality described herein that can be utilized with a summarization application in accordance with illustrative embodiments. In the illustrated embodiment, a user device 602 has a messaging application 604 installed that communicates over a network with a messaging server 610 that hosts a server-side messaging application 612. In the illustrated embodiment, the server-side messaging application 612 relays messages to and from the messaging application 604 on the user device 602 that are directed to or received from other user devices. In some such embodiments, the server-side messaging application 612 also transmits the messages to the summarization application 608 on server 606. In some such embodiments, the server-side messaging application 612 relays the messages in real-time or near real-time to the summarization application 608 as they are received for transmission to and from the messaging application 604. In other embodiments, the server-side messaging application 612 transmits messages in batches to the summarization application 608 automatically, for example according to a pre-established schedule or other criteria. In other embodiments, the server-side messaging application 612 transmits messages in batches to the summarization application 608 in response to a command input from the user via the messaging application 604 that causes the user device 602 to transmit the command to the server-side messaging application 612.

In the illustrated embodiment, the summarization application 608 receives messages from the server-side messaging application 612 and processes the messages to generate summary data that allows the messaging application 604 to render a summary dashboard, for example as shown in FIG. 4 as summary dashboard user interfaces 414 and 416. The summarization application 608 then transmits the summary data 0back to the server-side messaging application 612, which in turn transmits the summary data to the messaging application 604. In some embodiments, the summarization application 608 transmits the headline to the server-side messaging application 612 while the summarization application 608 is still generating the summary. In some embodiments, the process of receiving messages from the server-side messaging application 612 and responding with transmissions of headlines/headline updates and summaries/summary updates is an ongoing process that results in periodic revisions and updates to the summary dashboard being provided to the messaging application 604.

Figure 7:
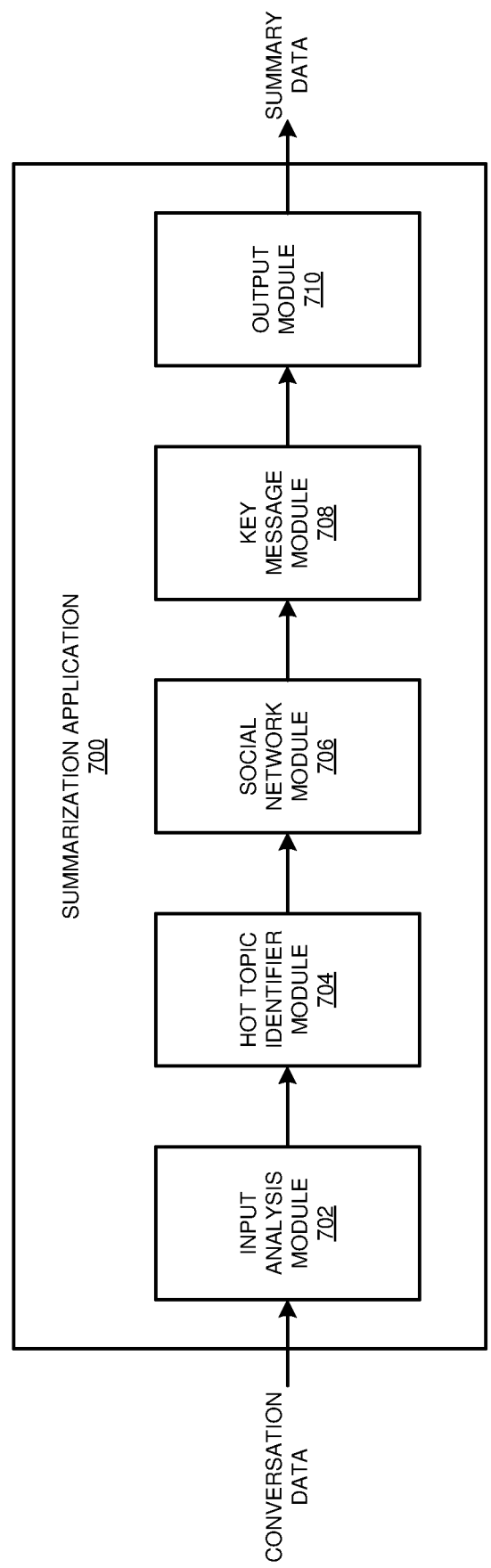
FIG. 7 depicts a block diagram of an example summarization application in accordance with an illustrative embodiment.

With reference to FIG. 7, this figure depicts a block diagram of an example summarization application 700 in accordance with an illustrative embodiment. In a particular embodiment, the example summarization application 700 is an example of summarization application 312 of FIG. 3, summarization application 404 of FIG. 4, summarization application 508 of FIG. 5, and summarization application 608 of FIG. 6.

In the illustrated embodiment, the summarization application 700 comprises an input analysis module 702, a hot topic identifier module 704, a social network module 706, a key message module 708, and an output module 710. In alternative embodiments, the summarization application 700 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In an illustrative embodiment, the input analysis module 702 receives and parses conversation data to extract message datasets and user datasets. The input analysis module 702 outputs this parsed conversation data to the hot topic identifier module 704.

The hot topic identifier module 704 classifies the message datasets into respective categories. In some embodiments, the hot topic identifier module 704 uses machine learning analysis. For example, in some embodiments, the hot topic identifier module 704 uses Natural Language Processing (NLP), such as Natural Language Understanding (NLU), to identify categories in messages represented by the message datasets.

The hot topic identifier module 704 also identifies one or more top categories from among the identified categories. In some embodiments, the hot topic identifier module 704 identifies top categories based on respective amounts of associated conversation data. For example, in some embodiments, the hot topic identifier module 704 identifies top categories for a summary period by identifying categories associated with messages that are more than $\mu$.% of all messages for that summary period, where $\mu$.% is any desired percentage and may be adjustable by user settings. The hot topic identifier module 704 outputs parsed conversation data of the top categories to the social network module 706.

The social network module 706 determines an impact each user has on each of the top categories. For each top category, the social network module 706 generates impact data for each user who contributed to the top category. In some embodiments, the social network module 706 generates impact data for a user who contributed to a particular top category by iterating through conversation data of the top category to identify the user's interactions and generate an impact factor value based on the identified interactions.

In some embodiments, the social network module 706 generates a numerical impact factor value for each user based on the accumulated impact data.

The social network module 706 also determines which contributing users fulfill certain roles for each of the top categories. For each top category, the social network module 706 generates role data for certain contributing users who fulfilled predetermined requirements for at least one of the roles. In some embodiments, the social network module 706 generates role data for a user who contributed to a particular top category by applying a rule to the conversation data for the user represented by the user dataset. There are a wide variety of possible roles and associated rules that would be implementation-specific that may be used for actual implementations of the embodiments disclosed herein. As non-limiting examples, one rule may assign the role of "originator" to a user who posted a first message for a particular category, another rule may assign the role of "contributor" to a user who has an impact factor value that is one of the top N impact factor values of users for the associated category (where N may be any desired integer and may be assigned a value based on user settings). The social network module 706 outputs parsed conversation data of the top categories with role data and impact data to the key message module 708.

The key message module 708 identifies key messages for each of the top categories. For each top category, the key message module 708 generates key index data for each message in the top category. In some embodiments, for each top category, the key message module 708 generates key index data by iterating through conversation data associated with the top category and identifying interactions with a message represented by the message dataset in the conversation data. The key message module 708 then identifies top message datasets for each top category. In some embodiments, for each top category, the key message module 708 identifies one or more top message datasets by comparing the key index data associated with the message dataset to key index data of other message datasets from the conversation data. The key message module 708 outputs key message and key role information for each top category to the output module 710.

The output module 710 generates output data arranged according to a specified data format that is compatible with a user interface. In some embodiments, the output module 710 generates the output data by formatting a role represented by the role data and an impact value represented by the impact data for the user represented by the user dataset and formats a key index value represented by the key index data for the message represented by the message dataset.

Figure 8:
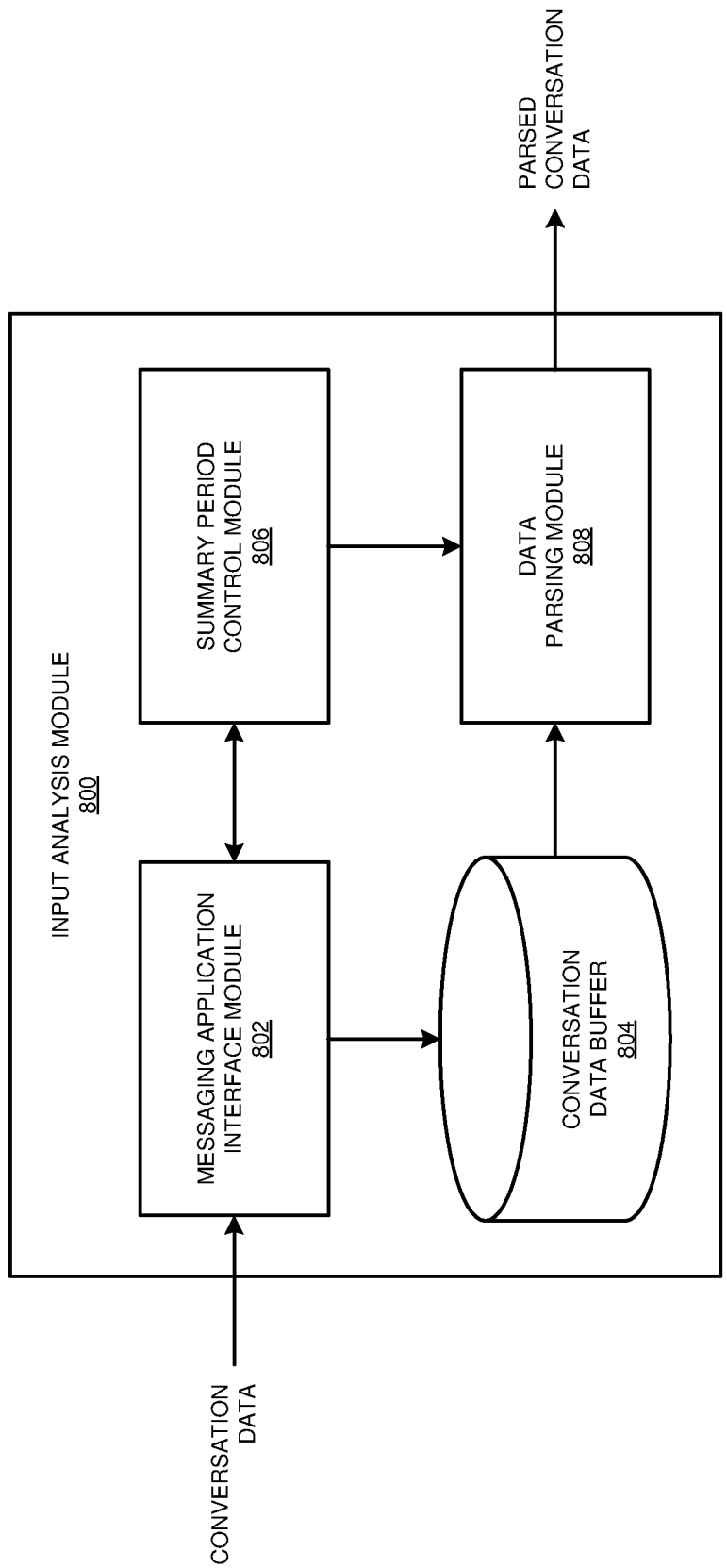
FIG. 8 depicts a block diagram of an example input analysis module in accordance with an illustrative embodiment.

With reference to FIG. 8, this figure depicts a block diagram of an example input analysis module 800 in accordance with an illustrative embodiment. In a particular embodiment, the example input analysis module 800 is a module of a summarization application, for example summarization application 700, and the input analysis module 800 is an example of input analysis module 702 of FIG. 7.

In the illustrated embodiment, the input analysis module 800 comprises a messaging application interface module 802, a conversation data buffer 804, a summary period control module 806, and a data parsing module 808. In alternative embodiments, the input analysis module 800 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In an illustrative embodiment, the messaging application interface module 802 establishes and controls communications with a messaging application and/or messaging application backend. In some embodiments, the messaging application interface module 802 establishes communications with a messaging application on the same server, on a different computing device on the same LAN, or across a larger network that includes the Internet. In some embodiments, the messaging application interface module 802 connects with an API of the messaging application via any suitable network or combination of networks such as the Internet, etc. and uses any suitable communication protocols such as Wi-Fi, Bluetooth, etc. As a non-limiting example, in an embodiment, the messaging application interface module 802 executes a routine to initiate a request to the messaging application (e.g., messaging application 504/604 or messaging application backend 512/612), which in turn issues conversation data to the messaging application interface module 802.

In an illustrative embodiment, the conversation data buffer 804 provides data storage for the conversation data received by the messaging application interface module 802. In some embodiments, the conversation data buffer 804 is accessible to, and available as data storage for, any of the elements of the input analysis module 800 or its summary application. In some embodiments, the conversation data buffer 804 is allocated in a computer readable storage medium. In some embodiments, the conversation data buffer 804 is allocated in a portion of a computer readable storage medium as a virtual disk.

In an illustrative embodiment, the summary period control module 806 provides timing and control functionality for instructing the messaging application interface module 802 to request conversation data from a messaging application. In some embodiments, the summary period control module 806 periodically instructs the messaging application interface module 802 to request conversation data. In some such embodiments, the summary period control module 806 instructs the messaging application interface module 802 to request conversation data every n hour, where n is any desired numerical value according to a desired summary period.

In an alternative embodiment, the summary period control module 806 provides timing and control functionality for instructing the data parsing module 808 to parse buffered conversation data in the conversation data buffer 804 to initiate the summarization processing performed by the summarization application. In some such embodiments, the messaging application interface module 802 receives the conversation data on an ongoing basis during the summary periods and buffers the conversation data in the conversation data buffer 804 until the next summary is generated.

In another alternative embodiment, the summary period control module 806 instructs the messaging application interface module 802 to request conversation data based on criteria other than a fixed period of time. For example, in some embodiments, the summary period control module 806 monitors the frequency at which messages are being posted and interactions are occurring and adjusts the summary period accordingly. In some such embodiments, the summary period control module 806 shortens the summary period as the frequency of messages and interactions increases and the summary period control module 806 lengthens the summary period as the frequency of messages and interactions decreases.

In an illustrative embodiment, the data parsing module 808 parses conversation data stored in the conversation data buffer 804. In some embodiments, the data parsing module 808 begins parsing the conversation data in response to an initiation instruction from the summary period control module 806. The data parsing module 808 extracts relevant data from the conversation data (e.g., message content, posting user, date/time of post or interaction, etc.).

In some embodiments, the data parsing module 808 organizes the extracted conversation data into one or more data groups. In some such embodiments, the data parsing module 808 extracts time and date information of posted messages and other interactions. In some such embodiments, the data parsing module 808 receives start and stop times for a summary period from the summary period control module 806. The data parsing module 808 then collects conversation data from the conversation data buffer 804 for messages and interactions that were posted during the specified summary period based on the extracted time and data information.

In some embodiments, the data parsing module 808 groups the extracted conversation data into one or more groups based on posting user. In some such embodiments, the data parsing module 808 extracts posting user information of posted messages and other interactions. In some such embodiments, the data parsing module 808 then arranges conversation data from the conversation data buffer 804 into groups according to posting user based on the extracted posting user information.

In some embodiments, the data parsing module 808 groups the extracted conversation data into one or more groups based on combinations of posting user and target user. For example, suppose User A posts a message, then User B posts a message as a reply to User A's message, and then User A posts an interaction (e.g., "like" or "favorite") for User B's reply message. When User B posts a message as a reply to User A's message, User B is considered the posting user and User A is the target user. When User A then posts an interaction (e.g., "like" or "favorite") for User B's reply message, User A is considered the posting user and User B is the target user. The data parsing module 808 will store a record of User B's reply to User A and a record of User A's interaction with User B's reply message in a group of messages and interactions between User B and User A. In some such embodiments, the data parsing module 808 extracts posting user and target user information of posted messages and other interactions. In some such embodiments, the data parsing module 808 then arranges conversation data from the conversation data buffer 804 into groups according to posting user/target user combinations based on the extracted posting user/target user information.

In further embodiments, the data parsing module 808 groups the extracted conversation data into one or more additional groups based on other criteria that may be implementation-specific parameters. Once the data parsing module 808 parses and groups the conversation data, the input analysis module 800 outputs the parsed conversation data.

Figure 9:
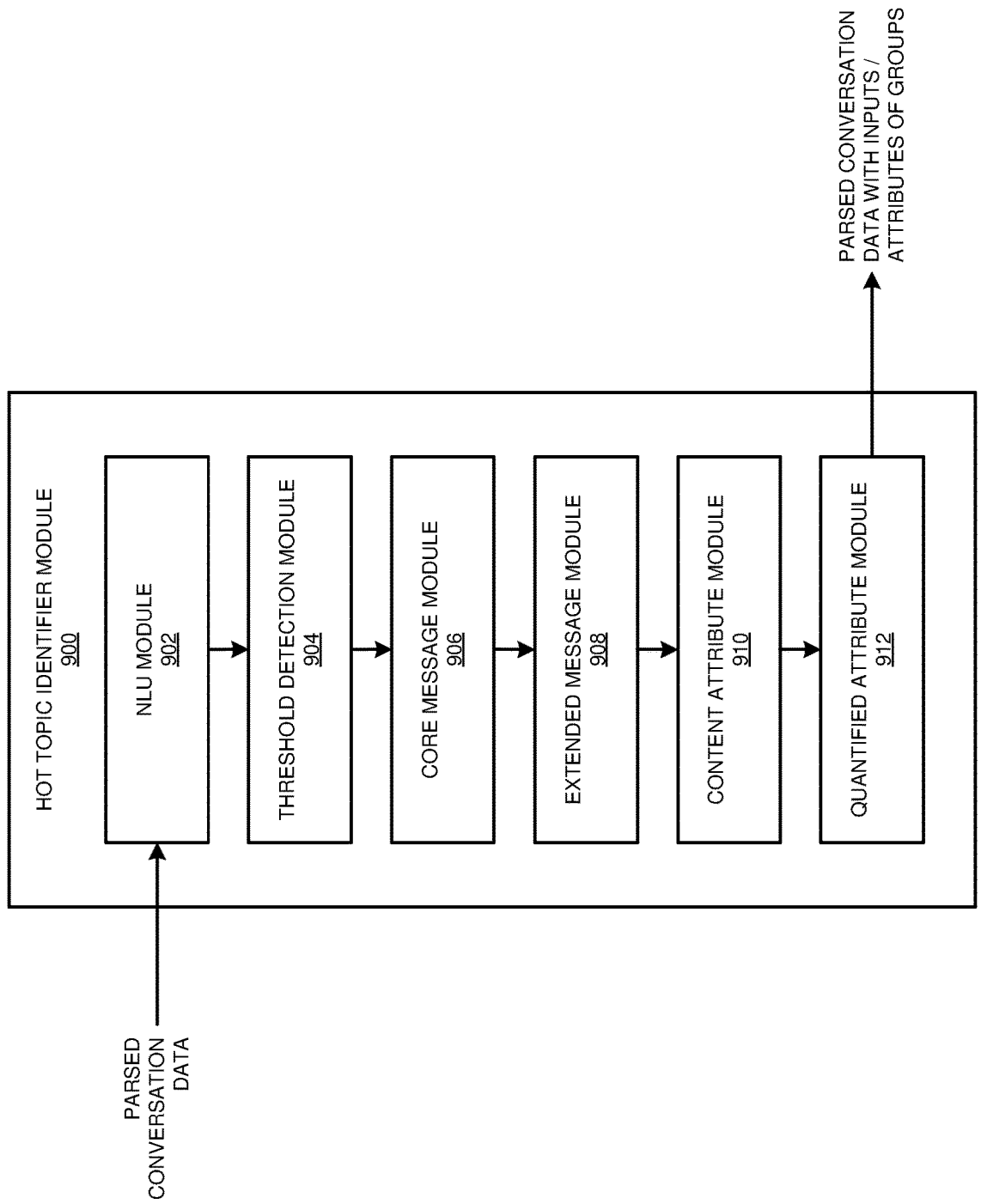
FIG. 9 depicts a block diagram of an example hot topic identifier module in accordance with an illustrative embodiment.

With reference to FIG. 9, this figure depicts a block diagram of an example hot topic identifier module 900 in accordance with an illustrative embodiment. In a particular embodiment, the example hot topic identifier module 900 is a module of a summarization application, for example summarization application 700, and the hot topic identifier module 900 is an example of hot topic identifier module 704 of FIG. 7.

In the illustrated embodiment, the input analysis module 900 comprises a Natural Language Understanding (NLU) module 902, a threshold detection module 904, a core message module 906, an extended message module 908, a content attribute module 910, and a quantified attribute module 912. In alternative embodiments, the hot topic identifier module 900 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

In an illustrative embodiment, the hot topic identifier module 900 receives the parsed conversation data from the input analysis module 800. The conversation data includes message datasets representative of posted messages. The hot topic identifier module 900 classifies each message according to a category associated with the message contents.

In the illustrated embodiment, the NLU module 902 analyzes the contents of each message and uses machine learning processing to identify one or more categories and sub-categories associated with the message contents. In some embodiments, the NLU module 902 uses machine learning analysis that is based on Natural Language Processing (NLP), such as Natural Language Understanding (NLU), to identify categories in messages represented by the message datasets. In some embodiments, the NLU module 902 performs the NLU processing. In alternative embodiments, the NLU module 902 communicates with a remote NLU service that performs the NLU processing and returns the processing results to the NLU module 902. A non-limiting example of NLU processing results from processing the message contents from the conversation data is shown as Table 1 below:

TABLE 1

| LEVEL 1 | LEVEL 2 | LEVEL 3 | LEVEL 4 |
|---|---|---|---|
| business and industrial | construction | | |
| business and industrial | energy | coal | |
| business and industrial | energy | electricity | |
| business and industrial | energy | natural gas | |
| business and industrial | energy | renewable energy | biofuel |
| business and industrial | energy | renewable energy | fuel cell |

In the example shown in Table 1, the NLU module 902 determined that each of the messages includes content related to the category "business and industrial," and determined that messages included content related to sub-categories "construction and energy." In this example, the NLU module 902 also identified deeper level sub-categories shown as level 3 and level 4 in Table 1, which include, under sub-category "energy," the sub-categories "coal," "electricity," and "renewable energy," and include, under sub-category "renewable energy," the sub-categories "biofuel" and "fuel cell." Table 1 shows a simple example for explanatory purposes and an actual implementation may include hundreds of categories and sub-categories in more or fewer levels.

The threshold detection module 904 identifies one or more top categories from among the identified categories. In some such embodiments, the top categories are categories and/or sub-categories associated with the largest number of posted messages. In some embodiments, the threshold detection module 904 identifies top categories based on respective amounts of associated conversation data. For example, in some embodiments, the threshold detection module 904 identifies top categories for a summary period by identifying categories associated with messages that are more than µ% of all messages for that summary period, where µ.% is a threshold percentage. The threshold percentage may be any desired percentage and may be adjustable by user settings.

In some embodiments, the threshold detection module 904 starts with lowest-level sub-categories searching for categories/sub-categories that satisfy the threshold percentage. If no categories/sub-categories are found that satisfy the threshold percentage, the threshold detection module 904 moves to the next-higher level of categories/sub-categories to search for categories/sub-categories that satisfy the threshold percentage. The threshold detection module 904 continues moving to higher levels until a category/sub-category is found that satisfies the threshold percentage. Using the example shown in Table 1, the threshold detection module 904 first searches for sub-categories in Level 4 that satisfy the threshold percentage. If no sub-category in Level 4 is found that satisfy the threshold percentage, then threshold detection module 904 searches the sub-categories in Level 3 for sub-categories that satisfy the threshold percentage. If still no sub-category in Level 3 is found that satisfy the threshold percentage, then threshold detection module 904 searches the sub-categories in Level 2 for sub-categories that satisfy the threshold percentage. If still no sub-category in Level 2 is found that satisfy the threshold percentage, then threshold detection module 904 searches the categories in Level 1 for categories that satisfy the threshold percentage.

In some embodiments, the number of top categories depends on the number of categories/sub-categories that are identified as satisfying the threshold percentage. For example, suppose the threshold percentage is set to 20%. For one summary period, there may be 40% of messages related to Category A, 25% of messages related to Category B, 15% of messages related to Category C, 15% of messages related to Category D, and 5% of messages related to Category E, resulting in the threshold detection module 904 identifying Category A and Category B as top categories. Then for another summary period, there may be 60% of messages related to Category C, 18% of messages related to Category A, 11% of messages related to Category B, 8% of messages related to Category D, and 3% of messages related to Category E, resulting in the threshold detection module 904 identifying only Category C as a top category. Then for yet another summary period, there may be 20% of messages related to Category B, 20% of messages related to Category C, 20% of messages related to Category E, 20% of messages related to Category F, 18% of messages related to Category A, and 2% of messages related to Category D, resulting in the threshold detection module 904 identifying Category B, Category C, Category E, and Category F as a top category. The hot topic identifier module 704 outputs parsed conversation data of the top categories to the social network module 706.

The core message module 906 receives the top categories identified by the threshold detection module 904. The core message module 906 then generates groups of messages associated with respective identified top categories. In some embodiments, the core message module 906 also includes interactions associated with the messages in the top category groups.

The extended message module 908 searches through messages that are not in the top category groups for messages that are related to messages in any of the top category groups. The messages may be related based on having similar concepts, keywords, or entity (e.g., name or title of person or business). For example, suppose threshold detection module 904 identifies a top categories Category A and Category B. The core message module 906 puts the messages identified by the NLU module 902 as relating to Category A in a group for Category A. The core message module 906 also puts the messages identified by the NLU module 902 as relating to Category B in a group for Category B. The extended message module 908 then searches for related messages that include concepts, keywords, or entities that are the same or similar to messages in the Category A group and adds the related messages to the Category A group. The extended message module 908 then also searches for related messages that include concepts, keywords, or entities that are the same or similar to messages in the Category B group and adds the related messages to the Category B group.

The content attribute module 910 generates frequency data indicative of the frequency of messages that include each of the top categories. In some embodiments, the content attribute module 910 also generates frequency data indicative of the frequency of concepts, keywords, and entities used by the extended message module 908 for adding messages to the top category groups.

The quantified attribute module 912 applies NLU processing to analyze the messages in the top category groups and identify sentiment or emotion in each of the messages. In some embodiments, the quantified attribute module 912 uses deep learning algorithms to analyze and extract sentiment and/or emotion information from the messages. For example, the quantified attribute module 912 may use NLU to analyze the messages by performing semantic analysis of the messages and identify whether the polarity of the message content is positive or negative. The quantified attribute module 912 may use NLU to analyze each message and identify whether the message conveys any particular emotion, such as sadness, joy, fear, etc.

In some embodiments, the quantified attribute module 912 generates frequency data indicative of the number of occurrences of particular sentiments and/or emotions in the top groups. The quantified attribute module 912 uses this frequency data to assign one or more attribute scores to each of the top category groups. For example, in some such embodiments the quantified attribute module 912 calculates the occurrences of different emotions and assigns a numerical value to the group indicative of the overall emotional characteristic of messages in a top category group. For example, emotions ranging from very happy to very sad may be assigned values ranging from 1 for very happy to 0 for very sad, for example 0.3 is somewhat sad, 0.5 is neutral, and 0.7 is somewhat happy. Values on this scale are assigned to each message in the group, and the values are then combined (e.g., by averaging the values of the individual messages) to determine an overall emotional tone of the messages in the group. Thus, a numerical value may be included on the summary dashboard for each group that provides an indication of the emotional tone of the messages for the associated category (e.g., indicating that users discussing this category are generally happy, sad, neutral, etc.). Also, in some such embodiments the quantified attribute module 912 may similarly calculate the occurrences of different sentiments of the messages of a group and assign a numerical value to the group indicative of the overall sentiment of messages in a top category group.

Figure 10:
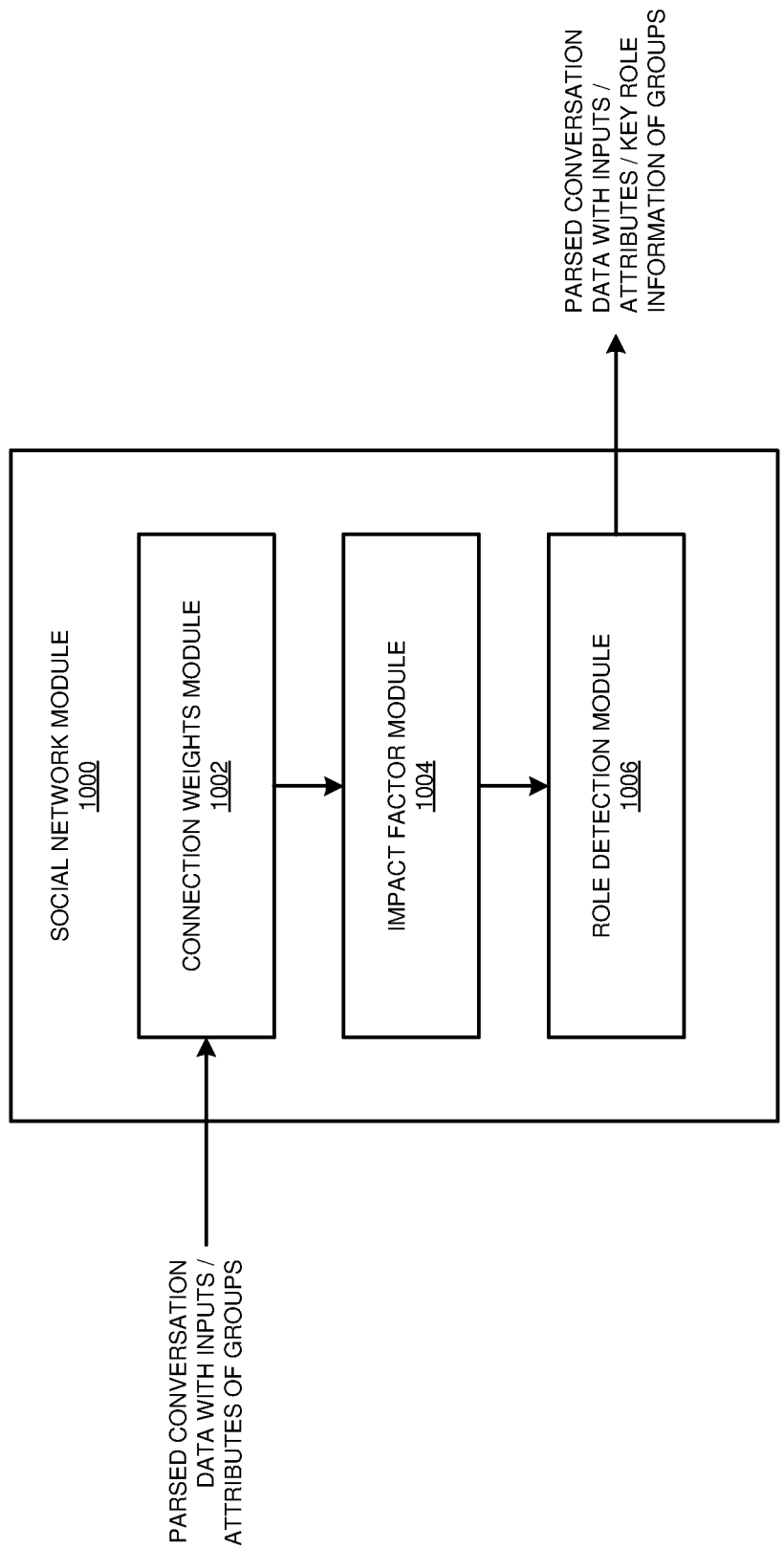
FIG. 10 depicts a block diagram of an example social network module in accordance with an illustrative embodiment.

With reference to FIG. 10, this figure depicts a block diagram of an example social network module 1000 in accordance with an illustrative embodiment. In a particular embodiment, the example social network module 1000 is a module of a summarization application, for example summarization application 700, and the social network module 1000 is an example of social network module 706 of FIG. 7.

In the illustrated embodiment, the social network module 1000 comprises a connection weights module 1002, an impact factor module 1004, and a role detection module 1006. In alternative embodiments, the social network module 1000 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

The social network module 1000 determines an impact that each user has on each of the top categories. For each top category, the connection weights module 1002 generates social network data based on user interactions in each of the hot category groups. For example, in some embodiments, the connection weights module 1002 assigns connection weights to each user for various types of activities involving other users. The connection weights module 1002 assigns connection weights each user based on mentions or direct messages from other users, replies from other users to the user's messages, and various interactions (e.g., like, favorite, etc.).

The impact factor module 1004 generates impact data for each user who contributed to the top category. The accumulated connection weights among members describe the impact in the network of each user. The impact factor module 1004 standardizes the accumulated connection weight totals into a specified range (e.g., a range of values in which 0 is the smallest and 1 is the largest). For example, in some embodiments, the impact factor module 1004 normalizes the connection weight totals by mapping the largest connection weight total to 1 and mapping the smallest connection weight total number maps to 0, and then changing other connection weight totals proportionally to values between 0 and 1.

In some embodiments, the impact factor module 1004 also calculates an Impact Factor (IF) for each top category group. In some such embodiments the impact factor module 1004 calculates the IF for the top category groups based on respective accumulations of IFs of the users in each group.

In some embodiments, the role detection module 1006 determines which contributing users fulfill certain roles for each of the top category groups. For each top category group, the role detection module 1006 generates role data for certain contributing users who fulfilled predetermined requirements for at least one of the roles. In some embodiments, the role detection module 1006 generates role data for users who contributed to a top category by applying a rule to the conversation data for the users. There are a wide variety of possible roles and associated rules that would be implementation-specific that may be used for actual implementations of the embodiments disclosed herein. As non-limiting examples, one rule may assign the role of "originator" to a user who posted a first message for a particular category, another rule may assign the role of "contributor" to a user who has an IF value that is one of the top N IF values of users for the associated category (where N may be any desired integer, and may be assigned a value based on user settings). The role detection module 1006 a list of users and associated roles for each of the top category groups.

Figure 11:
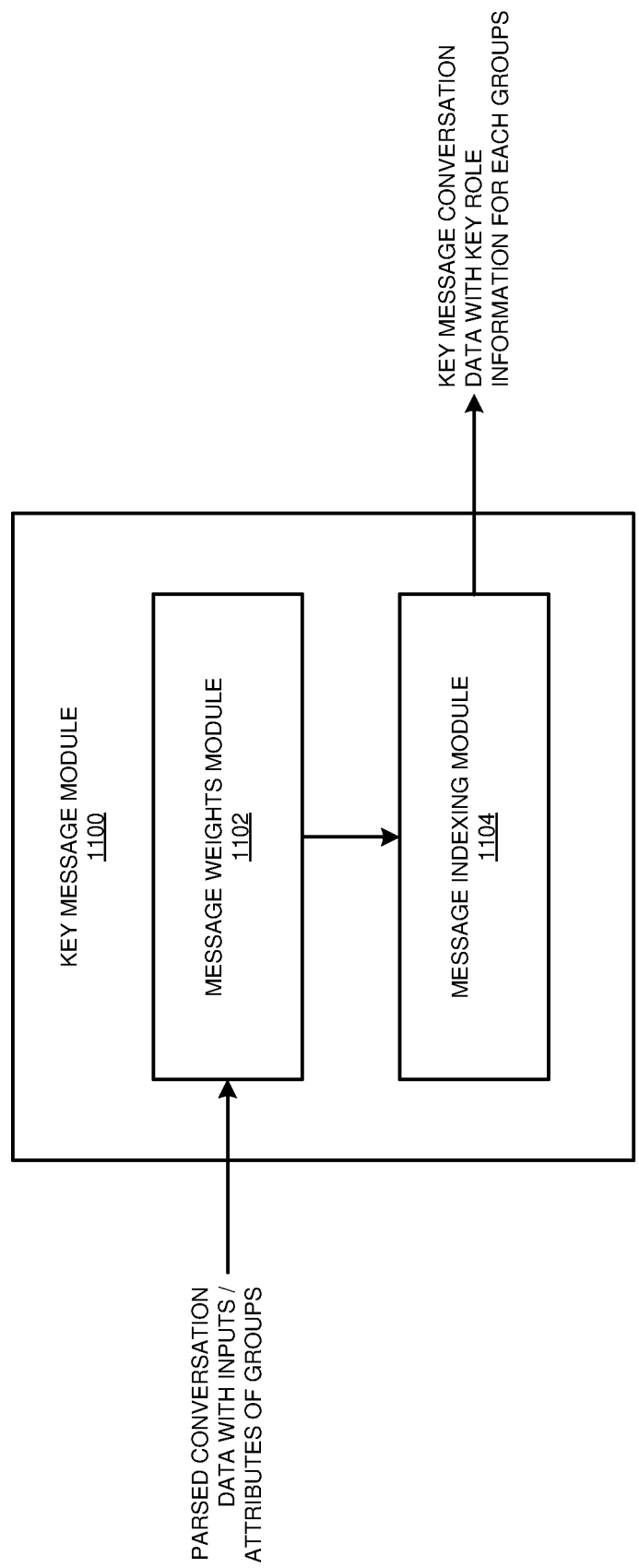
FIG. 11 depicts a block diagram of a key message module in accordance with an illustrative embodiment.

With reference to FIG. 11, this figure depicts a block diagram of a key message module 1100 in accordance with an illustrative embodiment. In a particular embodiment, the example key message module 1100 is a module of a summarization application, for example summarization application 700, and the key message module 1100 is an example of key message module 708 of FIG. 7.

In the illustrated embodiment, the key message module 1100 comprises a message weights module 1102 and a message indexing module 1104. In alternative embodiments, the key message module 1100 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

The key message module 1100 determines an impact that each message has on each of the top categories. For each message in each top category, the message weights module 1102 generates key index data based on user interactions with the message. For example, in some embodiments, the message weights module 1102 assigns connection weights to each message for various types of activities involving the message. The message weights module 1102 assigns connection weights each message based on mentions or direct messages from other users, replies from other users to the messages, and various interactions (e.g., like, favorite, etc.).

The message indexing module 1104 identifies the top M messages of each of the top category groups. In some embodiments, message indexing module 1104 identifies the top M messages in each group based on key index data generated by the message weights module 1102. In some embodiments, the message indexing module 1104 identifies, as the top M messages, the M messages having the highest key index values.

Figure 12:
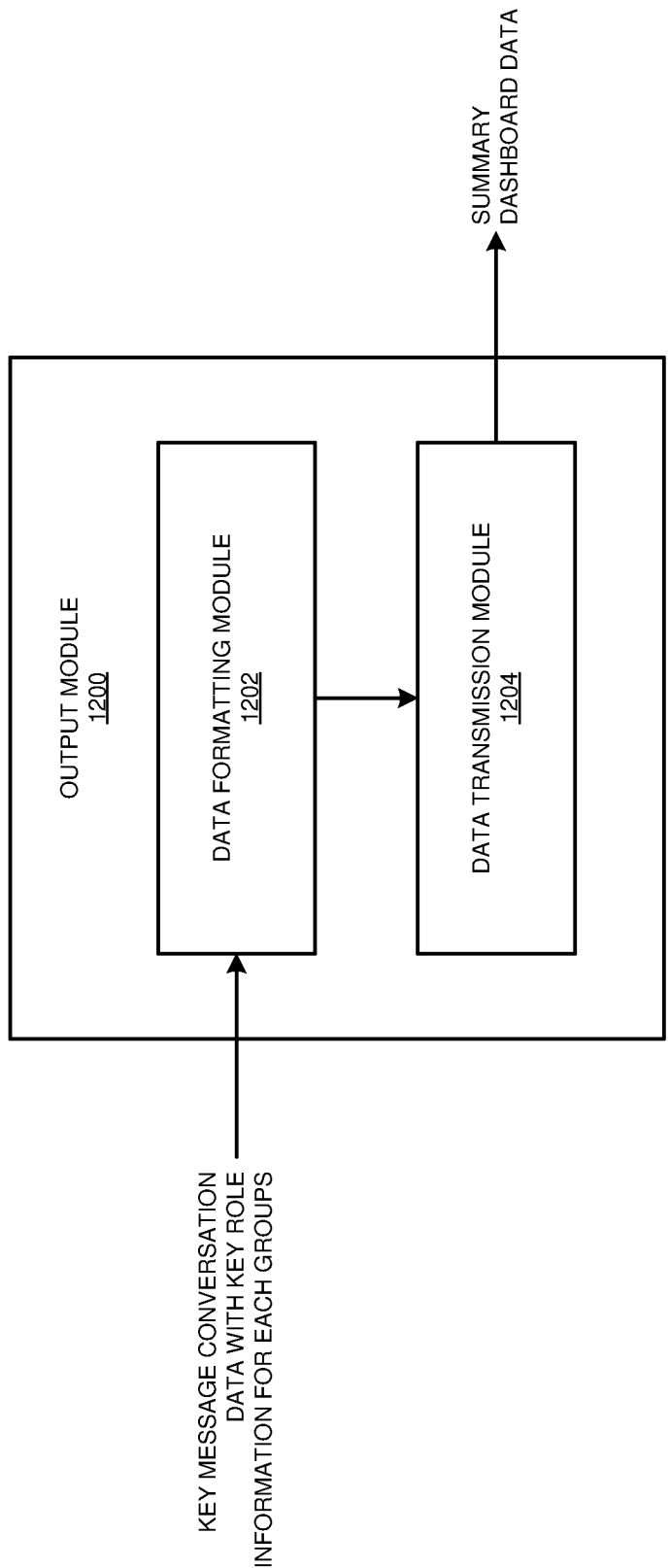
FIG. 12 depicts a block diagram of an output module in accordance with an illustrative embodiment.

With reference to FIG. 12, this figure depicts a block diagram of an output module 1200 in accordance with an illustrative embodiment. In a particular embodiment, the example output module 1200 is a module of a summarization application, for example summarization application 700, and the output module 1200 is an example of output module 710 of FIG. 7.

In the illustrated embodiment, the output module 1200 comprises a data formatting module 1202 and a data transmission module 1204. In alternative embodiments, the output module 1200 includes some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications.

The data formatting module 1202 prepares output data that includes the key message conversation data and key role data. In some embodiments, the data formatting module 1202 formats the output data as needed to allow for transmission to a user device. In some embodiments, the data formatting module 1202 formats the output data as needed for proper reception by the user device. For example, in some embodiments, the user device may include an API or may require data be formatted in a particular structure, such as formatting according to a data model (e.g., comma-separated values (CSV), Extensible Markup Language (XML), JavaScript Object Notation (JSON), Yet Another Markup Language (YAML), etc.). The data formatting module 1202 may send data to be merged with a template and rendered at the user's device. Alternatively, the data formatting module 1202 may format the output data according to a template and a data model that allows the data to be sent to user device already formatted for rendering by an application or web browser. The data transmission module 1204 then transmits the output data to the user device.

Figure 13:
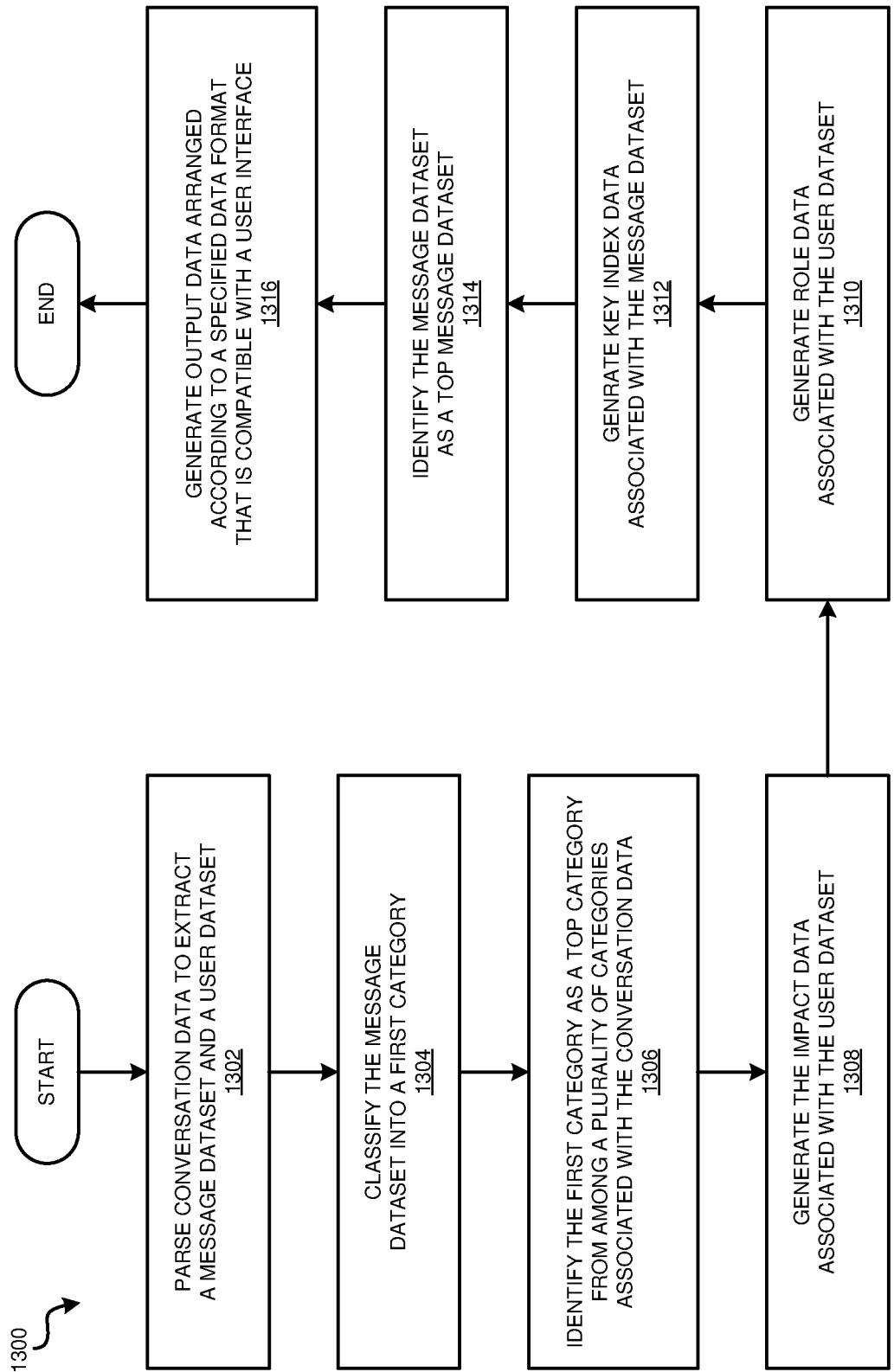
FIG. 13 depicts a flowchart of an example process for summarizing messages of a messaging application in accordance with an illustrative embodiment.

With reference to FIG. 13, this figure depicts a flowchart of an example process 1300 for summarizing messages of a messaging application in accordance with an illustrative embodiment. In a particular embodiment, the summarization application 700 carries out the process 1300.

In an embodiment, at block 1302, the process parses conversation data to extract a message dataset and a user dataset. Next, at block 1304, the process classifies the message dataset into a first category. In some embodiments, the classifying of the message dataset comprises analyzing the message dataset using machine learning. Next, at block 1306, the process identifies the first category as a top category from among a plurality of categories associated with the conversation data. In some embodiments, the plurality of categories comprises the first category, and the identifying of the first category as the top category is based at least in part on an amount of the conversation data associated with the first category. Next, at block 1308, the process generates impact data associated with the user dataset. In some embodiments, the generating of the impact data comprises iterating through conversation data associated with the top category and identifying actions in the conversation data by a user represented by the user dataset. Next, at block 1310, the process generates role data associated with the user dataset. In some embodiments, the generating of the role data comprises applying a rule to the conversation data for the user represented by the user dataset. Next, at block 1312, the process generates key index data associated with the message dataset. In some embodiments, the generating of the key index data comprises iterating through conversation data associated with the top category and identifying interactions with a message represented by the message dataset in the conversation data. Next, at block 1314, the process identifies the message dataset as a top message dataset. In some embodiments, the identifying of the message dataset as the top message dataset comprises comparing the key index data associated with the message dataset to key index data of other message datasets from the conversation data. Next, at block 1316, the process generates output data arranged according to a specified data format that is compatible with a user interface. In some embodiments, the generating of the output data comprises formatting a role represented by the role data and an impact value represented by the impact data for the user represented by the user dataset and formatting a key index value represented by the key index data for the message represented by the message dataset.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   parsing conversation data to extract a message dataset and a user dataset, wherein the user dataset represents a user;
   classifying the message dataset into a first category, wherein the classifying of the message dataset comprises analyzing the message dataset using machine learning;
   identifying the first category as a top category from among a plurality of categories associated with the conversation data, wherein the plurality of categories comprises the first category, wherein the identifying of the first category as the top category is based at least in part on an amount of the conversation data associated with the first category;
   generating impact data associated with the user dataset, wherein an impact factor value associated with impact data corresponding to a user represented by the user dataset is indicative of a contribution of the user to the first category, wherein the generating of the impact data comprises iterating through conversation data associated with the top category and identifying actions in the conversation data by the user represented by the user dataset;
   generating role data associated with the user dataset, wherein the generating of the role data comprises applying a rule to the conversation data for the user represented by the user dataset;
   generating key index data associated with the message dataset, wherein the generating of the key index data comprises iterating through conversation data associated with the top category and identifying interactions with a message represented by the message dataset in the conversation data; and
   generating output data arranged according to a specified data format that is compatible with a user interface, wherein the generating of the output data comprises formatting a role represented by the role data and an impact value represented by the impact data for the user represented by the user dataset and formatting a key index value represented by the key index data for the message represented by the message dataset.

2. The method of claim 1, further comprising:
   identifying the message dataset as a top message dataset, wherein the identifying of the message dataset as the top message dataset comprises comparing the key index data associated with the message dataset to key index data of other message datasets from the conversation data.

3. The method of claim 1, wherein the conversation data comprises messages posted during a period of time according to a specified summary period.

4. The method of claim 3, further comprising:
   monitoring posting activity that generates conversation data; and
   adjusting the amount of time for the specified summary period based on a pace of the posting activity.

5. The method of claim 3, wherein the parsing of the conversation data comprises extracting posting time data associated with messages in the conversation data;
   wherein the method further comprises:
   collecting conversation data for messages that were posted during the specified summary period based on the extracted posting time data.

6. The method of claim 1, wherein the parsing of the conversation data comprises extracting posting user data associated with messages in the conversation data;
   wherein the method further comprises:
   grouping the message with one or more other messages posted by the user as a first group based on the posting user data.

7. The method of claim 6, further comprising:
   identifying emotions in the messages in the first group; and
   calculating a numerical value representative of the emotions in the messages in the first group.

8. The method of claim 1, wherein the analyzing of the message dataset using machine learning comprises identifying a category in the message using natural language understanding analysis.

9. The method of claim 1, wherein the identifying of the first category as the top category comprises identifying that messages associated with the first category are more than a threshold percentage of all messages in the conversation data.

10. The method of claim 1, wherein the generating of the impact data comprises generating a numerical impact factor value for the user based on the generated impact data.

11. The method of claim 10, wherein the applying of the rule comprises determining whether the user satisfies the rule based on the numerical impact factor value for the user.

12. A computer program product comprising one or more computer readable storage media, and program instructions collectively stored on the one or more computer readable storage media, the program instructions executable by a processor to cause the processor to perform operations comprising:
   parsing conversation data to extract a message dataset and a user dataset, wherein the user dataset represents a user;
   classifying the message dataset into a first category, wherein the classifying of the message dataset comprises analyzing the message dataset using machine learning;
   identifying the first category as a top category from among a plurality of categories associated with the conversation data, wherein the plurality of categories comprises the first category, wherein the identifying of the first category as the top category is based at least in part on an amount of the conversation data associated with the first category;

generating impact data associated with the user dataset, wherein an impact factor value associated with impact data corresponding to a user represented by the user dataset is indicative of a contribution of the user to the first category, wherein the generating of the impact data comprises iterating through conversation data associated with the top category and identifying actions in the conversation data by the user represented by the user dataset;

generating role data associated with the user dataset, wherein the generating of the role data comprises applying a rule to the conversation data for the user represented by the user dataset;

generating key index data associated with the message dataset, wherein the generating of the key index data comprises iterating through conversation data associated with the top category and identifying interactions with a message represented by the message dataset in the conversation data; and generating output data arranged according to a specified data format that is compatible with a user interface, wherein the generating of the output data comprises formatting a role represented by the role data and an impact value represented by the impact data for the user represented by the user dataset and formatting a key index value represented by the key index data for the message represented by the message dataset.

13. The computer program product of claim 12, wherein the stored program instructions are stored in a computer readable storage device in a data processing system, and wherein the stored program instructions are transferred over a network from a remote data processing system.

14. The computer program product of claim 12, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

15. The computer program product of claim 12, further comprising:
identifying the message dataset as a top message dataset, wherein the identifying of the message dataset as the top message dataset comprises comparing the key index data associated with the message dataset to key index data of other message datasets from the conversation data.

16. The computer program product of claim 12, wherein the conversation data comprises messages posted during a period of time according to a specified summary period.

17. The computer program product of claim 16, further comprising:
monitoring posting activity that generates conversation data; and
adjusting the amount of time for the specified summary period based on a pace of the posting activity.

18. A computer system comprising a processor and one or more computer readable storage media, and program instructions collectively stored on the one or more computer readable storage media, the program instructions executable by the processor to cause the processor to perform operations comprising:
parsing conversation data to extract a message dataset and a user dataset, wherein the user dataset represents a user;
classifying the message dataset into a first category, wherein the classifying of the message dataset comprises analyzing the message dataset using machine learning;
identifying the first category as a top category from among a plurality of categories associated with the conversation data, wherein the plurality of categories comprises the first category, wherein the identifying of the first category as the top category is based at least in part on an amount of the conversation data associated with the first category;
generating impact data associated with the user dataset, wherein an impact factor value associated with impact data corresponding to a user represented by the user dataset is indicative of a contribution of the user to the first category, wherein the generating of the impact data comprises iterating through conversation data associated with the top category and identifying actions in the conversation data by the user represented by the user dataset;
generating role data associated with the user dataset, wherein the generating of the role data comprises applying a rule to the conversation data for the user represented by the user dataset;
generating key index data associated with the message dataset, wherein the generating of the key index data comprises iterating through conversation data associated with the top category and identifying interactions with a message represented by the message dataset in the conversation data; and
generating output data arranged according to a specified data format that is compatible with a user interface, wherein the generating of the output data comprises formatting a role represented by the role data and an impact value represented by the impact data for the user represented by the user dataset and formatting a key index value represented by the key index data for the message represented by the message dataset.

19. The computer system of claim 18, further comprising:
identifying the message dataset as a top message dataset, wherein the identifying of the message dataset as the top message dataset comprises comparing the key index data associated with the message dataset to key index data of other message datasets from the conversation data.

20. The computer system of claim 18, wherein the conversation data comprises messages posted during a period of time according to a specified summary period, and further comprising:
monitoring posting activity that generates conversation data; and
adjusting the amount of time for the specified summary period based on a pace of the posting activity.

* * * * *